(12) United States Patent
Maestri et al.

(10) Patent No.: US 9,657,853 B2
(45) Date of Patent: May 23, 2017

(54) MODULAR AND COMPOSABLE DEVICE FOR MIXING LIQUIDS WITH ELECTRONIC CONTROL OF THE TEMPERATURE AND OF THE FLOWRATE OF THE OUTLET FLOW

(71) Applicant: DOMO HYDROS S.R.L., Trento (IT)

(72) Inventors: Riccardo Maestri, Treviso (IT); Alessandro Chies, Treviso (IT)

(73) Assignee: DOMO HYDROS S.R.L., Trento (IT)

( * ) Notice: Subject to any disclaimer, the term of this patent is extended or adjusted under 35 U.S.C. 154(b) by 0 days.

(21) Appl. No.: 14/784,273

(22) PCT Filed: Apr. 22, 2014

(86) PCT No.: PCT/EP2014/001059
§ 371 (c)(1),
(2) Date: Oct. 13, 2015

(87) PCT Pub. No.: WO2014/173524
PCT Pub. Date: Oct. 30, 2014

(65) Prior Publication Data
US 2016/0076661 A1    Mar. 17, 2016

(30) Foreign Application Priority Data
Apr. 26, 2013    (IT) .............................. MO2013A0114

(51) Int. Cl.
| | |
|---|---|
| G05D 23/13 | (2006.01) |
| G05D 23/19 | (2006.01) |
| G05D 7/06 | (2006.01) |
| F16K 11/22 | (2006.01) |
| F16K 11/087 | (2006.01) |
| G05D 16/20 | (2006.01) |

(52) U.S. Cl.
CPC .......... *F16K 11/087* (2013.01); *G05D 7/0635* (2013.01); *G05D 16/2013* (2013.01); *G05D 23/1393* (2013.01); *G05D 23/1919* (2013.01)

(58) Field of Classification Search
CPC ... F16K 11/087; F16K 11/22; G05D 16/2046; G05D 23/1393; G05D 23/1919; G05D 7/0658; Y10T 137/87684; Y10T 137/87885
USPC .................................. 236/12.12, 12.15, 92 R
See application file for complete search history.

(56) References Cited

U.S. PATENT DOCUMENTS

| | | | | |
|---|---|---|---|---|
| 6,871,576 | B2* | 3/2005 | Vari ..................... | F15B 13/0814 137/15.21 |
| 6,990,999 | B2* | 1/2006 | Patel ................... | F15B 13/0814 137/596.16 |
| 7,458,520 | B2* | 12/2008 | Belz ................... | G05D 23/1393 236/12.12 |

(Continued)

FOREIGN PATENT DOCUMENTS

| | | |
|---|---|---|
| CD | 186530 A | 9/1936 |
| GB | 2 488 361 A | 8/2012 |
| WO | WO 93/22714 A1 | 11/1993 |

*Primary Examiner* — Seth W Mackay-Smith
(74) *Attorney, Agent, or Firm* — John Alumit (57) ABSTRACT

The present invention is part of the field of flowrate mixing and adjusting devices and in particular relates to a new device for mixing and adjusting the flow of liquids with electronic control of the temperature and of the flowrate, for domestic and/or industrial plumbing systems. The device is modular and stackable.

10 Claims, 7 Drawing Sheets

(56) References Cited

U.S. PATENT DOCUMENTS

| | | | | |
|---|---|---|---|---|
| 7,819,383 B2* | 10/2010 | Morris | ...................... | F16K 5/20 |
| | | | | 251/162 |
| 8,020,585 B2* | 9/2011 | Shock | ....................... | F17D 5/02 |
| | | | | 137/554 |
| 8,336,736 B2* | 12/2012 | Schroeder | ............... | F16L 39/00 |
| | | | | 137/884 |
| 2002/0029443 A1 | 3/2002 | Ortiz | | |
| 2002/0134847 A1 | 9/2002 | Brooks | | |
| 2010/0148101 A1* | 6/2010 | Narita | ................... | F16K 27/003 |
| | | | | 251/129.01 |
| 2012/0216893 A1* | 8/2012 | Shapira | .............. | G05D 23/1393 |
| | | | | 137/605 |

\* cited by examiner

MODULAR AND COMPOSABLE DEVICE FOR MIXING LIQUIDS WITH ELECTRONIC CONTROL OF THE TEMPERATURE AND OF THE FLOWRATE OF THE OUTLET FLOW

The present invention relates to the field of devices for mixing and adjusting the flowrate and in particular relates to a new device for mixing and regulating the flow of liquids with electronic control of the temperature and of the flowrate for plumbing systems, for domestic and/or industrial use.

BACKGROUND ART

Plumbing plants are known that are installed in homes, offices and factories to serve corresponding installations. Currently, said plumbing plants have two distinct pipes, one for cold water and the other for hot water, so as to convey the water to each plumbing accessory such as washbasins, showers, etc. At the dispenser and the mixer, the flowrate of the outlet flow is mixed and adjusted by fixtures and fittings that open or close, to different extents, the check valves located in the pipes. With these mechanical adjusting systems the ratio between the flowrates of the flows of hot and cold flows is adjusted, i.e. the final temperature of the water. The aforesaid technology, of mechanical type, is not devoid of drawbacks, first above all the high labour costs for installation and maintenance. It is also known that said double-pipe systems require walls to be demolished if the double-pipe systems are replaced or repaired and/or to modify the position of the plumbing installations which implies greater labour and material costs.

Single-pipe plumbing plants are also known i.e. plants comprising a sole pipe that conveys already mixed water to the plumbing installation.

In this case, mixing occurs upstream of the distribution, in a mixing collector, where the two pipes of the hot and cold water arrive and from which a single delivery conduit leads, for each plumbing feature as far as the installation to be served. The water, which has been properly mixed so as to have the desired temperature, reaches the installation through the single conduit, avoiding the use of two pipes, as indicated above.

In this manner, the use of two pipes is avoided, with a significant saving of time and material and installation costs.

In this case, mixing occurs upstream of distribution of the corresponding device, generally near the boiler, and by means the distribution collector, a three-way valve being connected-respectively at the inlet- to the hot and cold water conduits, at the outlet to the delivery conduit of the thus mixed water.

Each conduit conveys water, mixed by the solenoid valve, to the plumbing installation to be served: the user uses an adjusting knob near the plumbing installation to adjust mixing and through electrical cables connected to the solenoid valve or to the corresponding control circuit commands the operation of the mixing collector.

In this manner, by modifying the position of the adjusting knob, the position of the solenoid valve is adjusted, i.e. mixing of hot and cold water and the flowrate of the outlet water.

DISCLOSURE AND ADVANTAGES OF THE INVENTION

The aim of the present invention is to provide the prior art with a method and system for mixing and adjusting flows of hot and cold water through electronic control of the temperature and flowrate, so that the water arrives already mixed and at the temperature (and flowrate) requested by the user.

Another object of the present invention is to be compact and easy to install.

Another object of the present invention is to be modular, with the advantage of being conveniently joined to same devices.

The rapid stacking holes simplify the assembly of several devices, thus creating a compact distribution system.

Another object is to provide, in the case of joining of several devices as disclosed above, common serving by a single inlet conduit of the cold water and inlet conduit of the hot water.

Another object of the present invention is to create contacts that are able to act as a supply bridge for supplying the entire distribution pack formed of several joined devices; only one of said devices will be connected to the electric source.

Another object of the present invention is the use of a pressure switch that owing to detection of the outlet pressure triggers an emergency system in the case of water leaks.

Another object of the present invention is the use of minimal components and reduced dimensions of the object so as to reduce costs and waste.

Another object of the present invention is to use materials that are compatible with foodstuffs with high thermal insulation such as PETP, POM-C, TEFLON.

Another object of the present invention is to have a device that is able to control the mixed outlet temperature; a temperature probe, connected to the electronics, conducts a retrospective check of drive motors of the spheres intercepting the fluid of the device.

Another object of the present invention is to manage with precision the adjustment by using as a reference point a mechanical limit switch.

Another object of the present invention is to have a device that is able to provide an emergency stop in the event of a supply interruption.

Such objects and advantages have all been achieved by the modular and composable mixing device, with electronic control of the temperature and of the flowrate of the outlet flow that is the object of the present invention, which is characterised by what is set out in the following claims.

BRIEF DESCRIPTION OF DRAWINGS

This and other features will be clearer from the following description of certain embodiments illustrated merely by way of non-limiting example in the attached drawings.

DESCRIPTION OF THE INVENTION

With particular reference to the drawings indicated above, 20 overall refers to a solenoid valve or device for mixing and adjusting flow of liquids with electronic control of the temperature and of the flowrate.

Overall, the solenoid valve 20 comprises a first body 22, the actual valve body for intercepting fluids, of the three-way type (two inlets, one outlet); said first body 22 is joined to a second body 21 that extends perpendicularly therefrom and is suitable containing components such as for example the motor control electronics for driving fluid intercepting means, and others specified better below.

As said, the valve body 22 is of the three-way type and thus comprises two inlet holes, indicated with the reference 5, and a single outlet hole indicated with 9. The two inlet holes 5 are connectable to the hot and cold water conduits arriving from the plant upstream whereas from the hole 9 the water mixed by the device 20 exits.

The outlet conduit 9 is obtained along the axis AA of the valve whereas the connecting conduit 23 is obtained along the perpendicular axis BB; in other terms, the conduit 23 connects the conduit 9 and the inlet holes 5 with respective branches.

Figure 3:
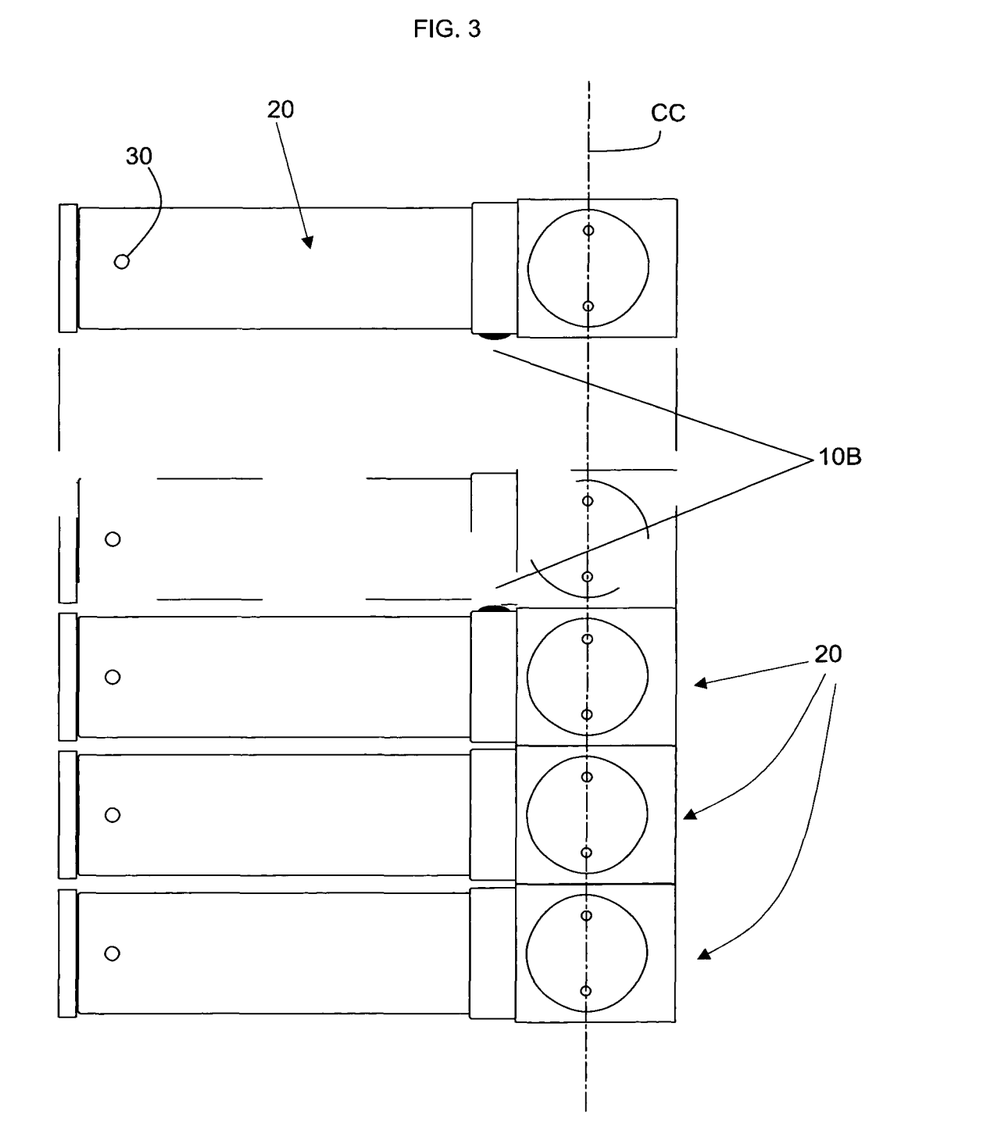
FIGS. 3 and 3A: illustrate the devices joined in parallel and integral with one another so as to define a single distribution system; the devices are connected electrically by supply bridge contacts and a hot and cold water inlet collector.

The inlet holes 5 are on the other hand connected perpendicularly to both, i.e. along the axis CC defined in FIG. 3. Along the conduit 23, i.e. between the outlet conduit 9 and the respective branches connecting the holes 5, spheres 4 are located for intercepting and adjusting the flowrates of hot and/or cold water (arriving at each branch).

The spheres 4 are known members for intercepting fluids and the corresponding passage cavity can be adjusted according to positions of partial and/or total opening or closure of the corresponding conduit 23. In fact, the rotation of the spheres 4 is commandable by respective pins 3 that are inserted into the body 22 through corresponding holes 2 arranged along axes DD that are parallel and coplanar to the axis AA of the outlet conduit.

In turn, the pins 3 are connected, at the opposite end, to corresponding motors-reduction gears 14 that manage the rotation along the corresponding axis DD according to the signals arriving from the control electronics, identified with 1 inside the body 21.

Also, the pins 3 have seal members 3C for coupling between hole 11 so as to ensure the seal thereof.

A portion 3B of the pin 3, namely what extends from the side of the body 21 (i.e. the side of the device 20 that controls the electronics and the control of the spheres) has a square section: this enables the position of the pin to be zeroed, with respect to the rotation axis DD thereof, using a limit switch 12 as a zero point.

The motors and the limits switches are fixed within the body 21 by means of a support 13.

The motors 14 act mechanically on the pins 3 which in turn position the spheres controlling the flowrate.

From the drawing, the end portion 3D of the pin 3 is observed, said end portion 3D being suitable for insertion into a seat 18 obtained on the corresponding sphere; the section of said seat 18 and of the corresponding portion 3D is quadrangular so as to make the pin 3 and the sphere 4 integral and in this manner to adjust the flowrate and the temperature.

The control electronics 1 acts on the motors 14 controlling the position thereof through the aforesaid mechanical limit switch.

The disclosed system is thus able to adjust two distinct flows coming from the holes 5 found in the valve body 22.

Figure 1:
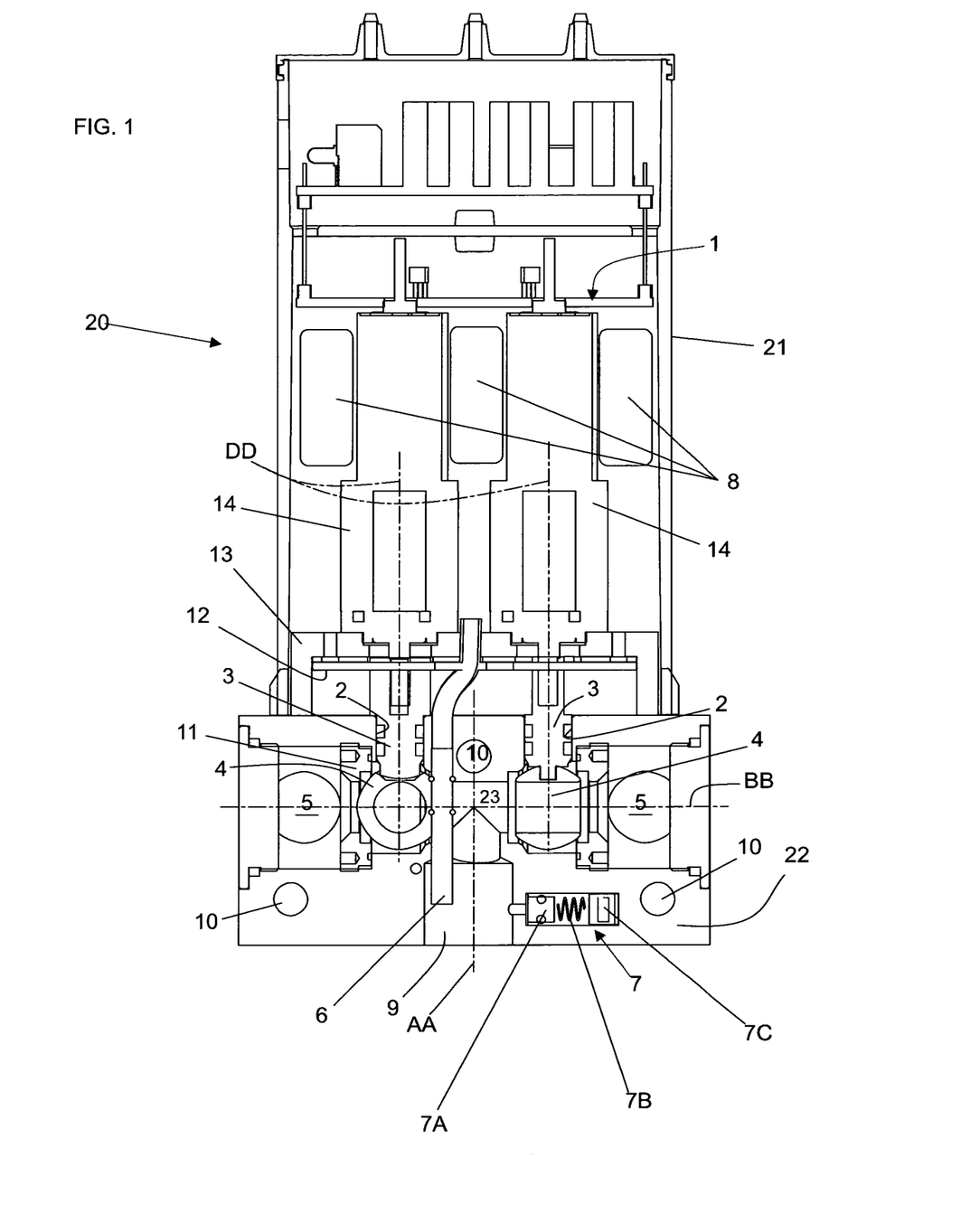
FIG. 1: is a schematic illustration of a solenoid valve or device for mixing and adjusting the flow of liquids with electronic control of the temperature and of the flow rate, which is the object of the present invention.
Figure 2:
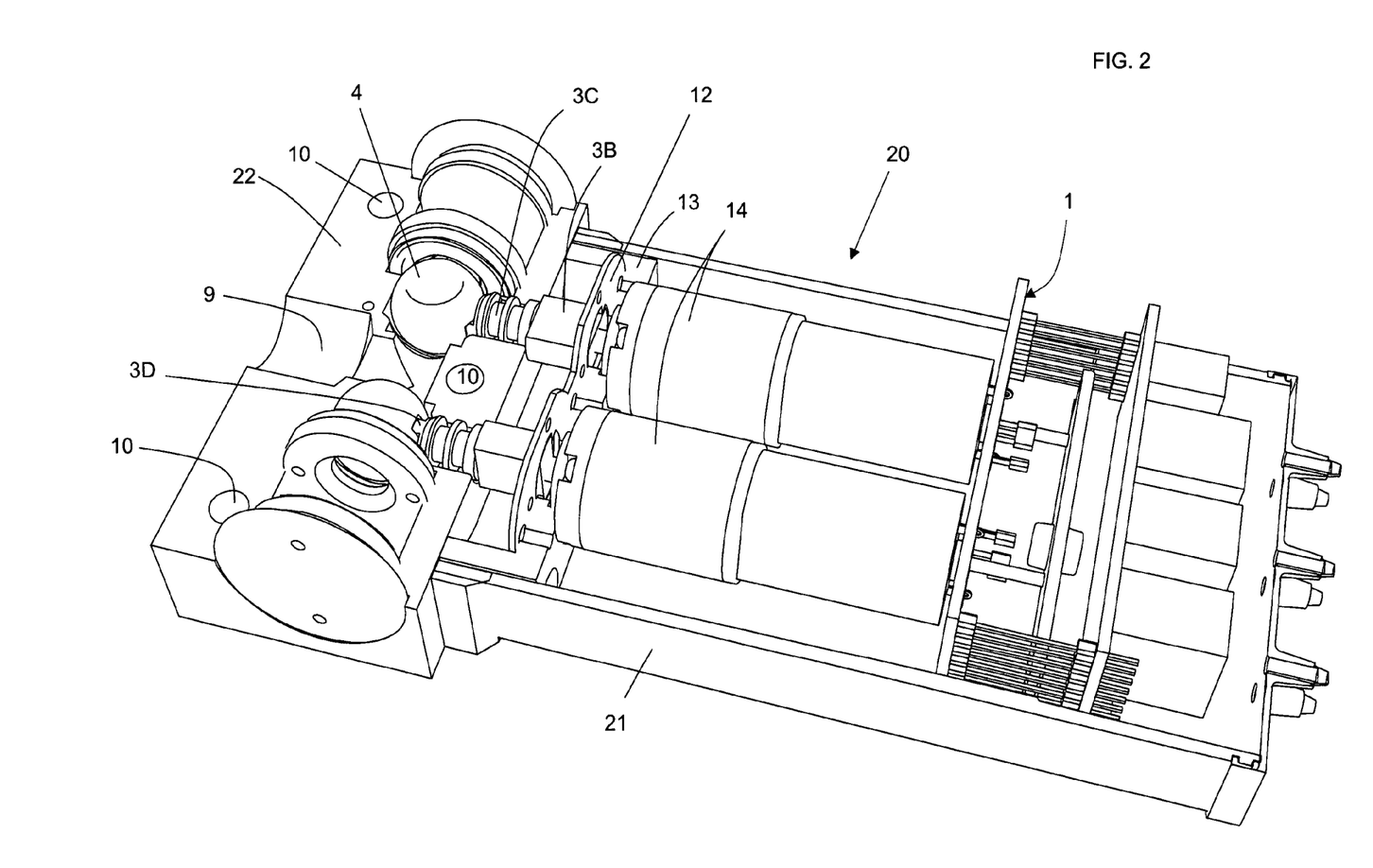
FIG. 2: also illustrates the device without upper casing and in a three-dimensional view

Holes 10 are also present for rapid stacking of the units that have just been disclosed; in fact, as has been said, the system is modular and can consist of two or more devices 20 with valve bodies 22 connected parallel, as drawing 2 clearly illustrates.

Accordingly, the aforesaid holes 10 simplify the assembly of several devices 20, creating a compact distribution system that is rapidly stacked. A plurality of contacts 10B will act as a supply bridge to enable the entire distribution system to be supplied, connecting a sole device 20 to the electric source.

In order to control the temperature on the mixed outlet 9, a temperature control probe 6 is located inside the said conduit.

The probe 6 is connected to the control electronics 1 that can thus precisely adjust the pin 3 control motors to adjust and stabilise the outlet temperature.

A pressure sensor, indicated overall by the reference 7, is provided to control the pressure on the mixed outlet 9, the said pressure sensor comprising:

a piston 7A with magnet a magnet field sensor 7C a spring 7B.

The piston 7A, if it is driven by pressure on the outlet, approaches the sensor 7C, which will detect the presence of the associated magnet.

If the outlet pressure fails, the spring 7B positions the piston 7A (with magnet) in the rest position, the point in which the sensor 7C is unable to detect the presence thereof.

Said sensor 7C is connected to the control electronics 1 and provides the system with a precise indication of the presence of pressure at the outlet 9.

In this manner, the system is able to detect possible losses and in this case will intervene to take the motors 2A to the closed position of the conduit 23.

As is clear from everything that has been disclosed above, the device 20 is an electromechanical system for adjusting the flow of liquids by suitable positioning of the spheres 4.

The device also comprises storage batteries, identified with 8, which will activate an emergency mode even in the absence of mains electric power. The batteries 8 enable the spheres to be returned to the closed position and the security of the system to be ensured.

Figure 3A:
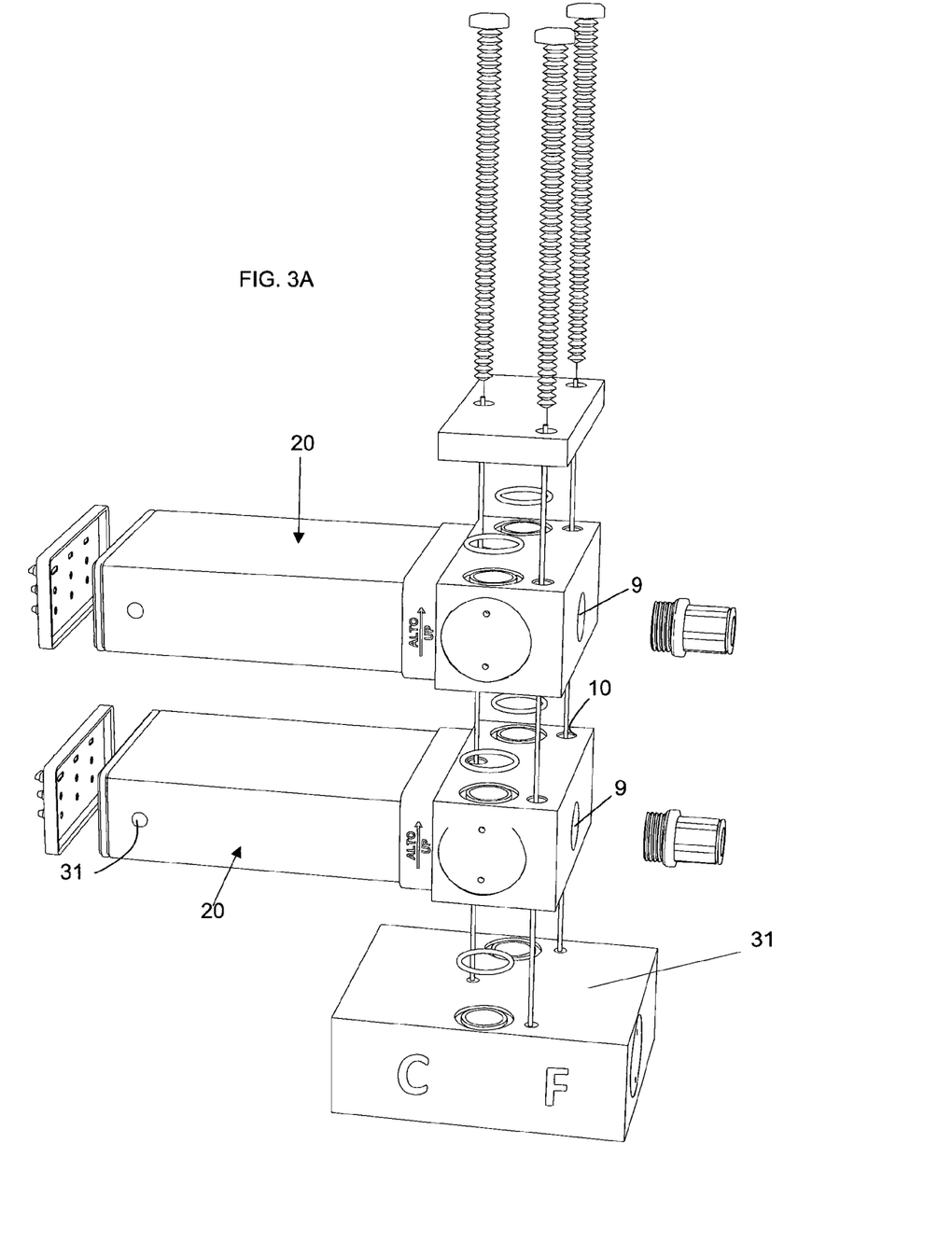
Figure 4:
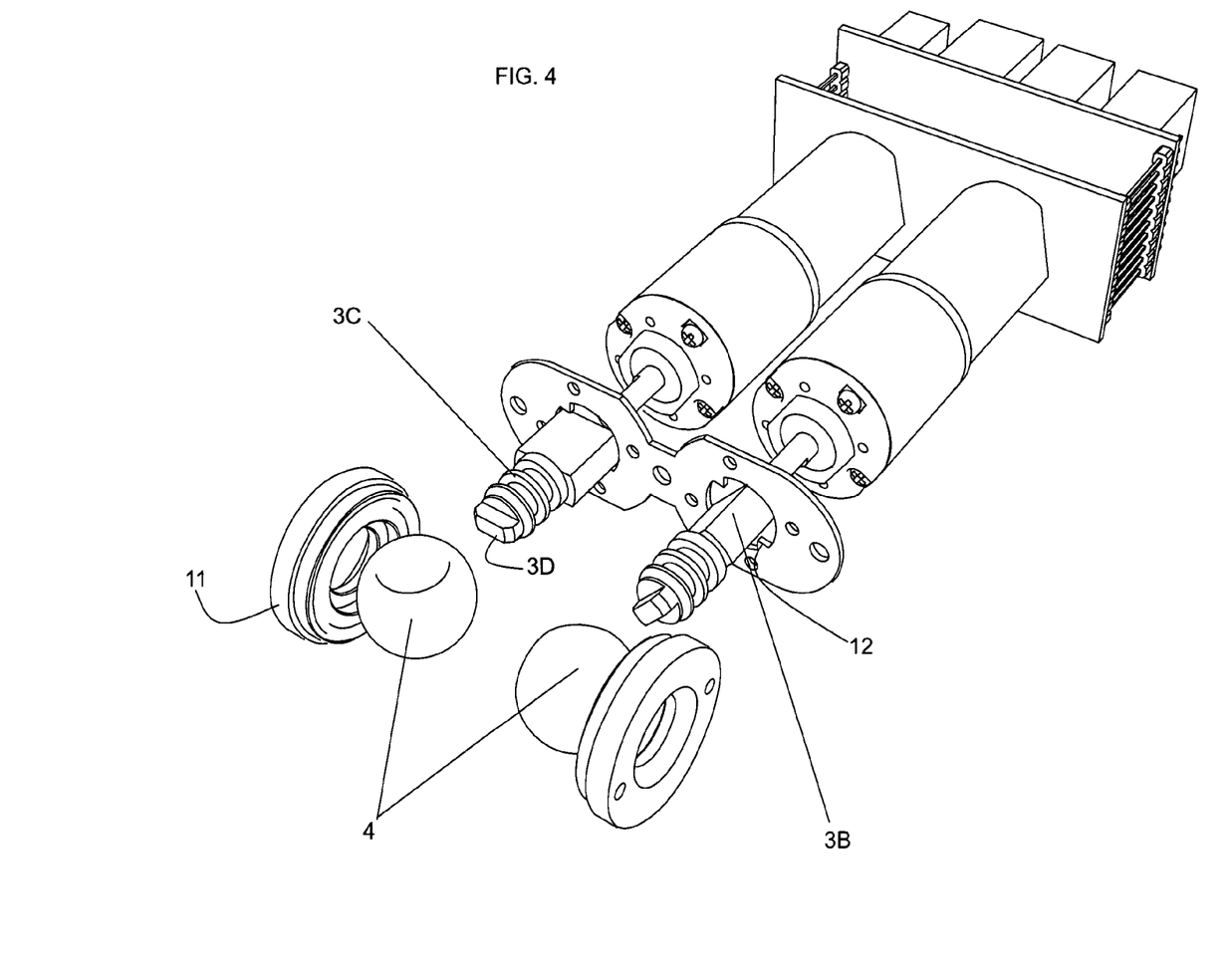
FIG. 4 illustrates an exploded view of the components inside the device.
Figure 5:
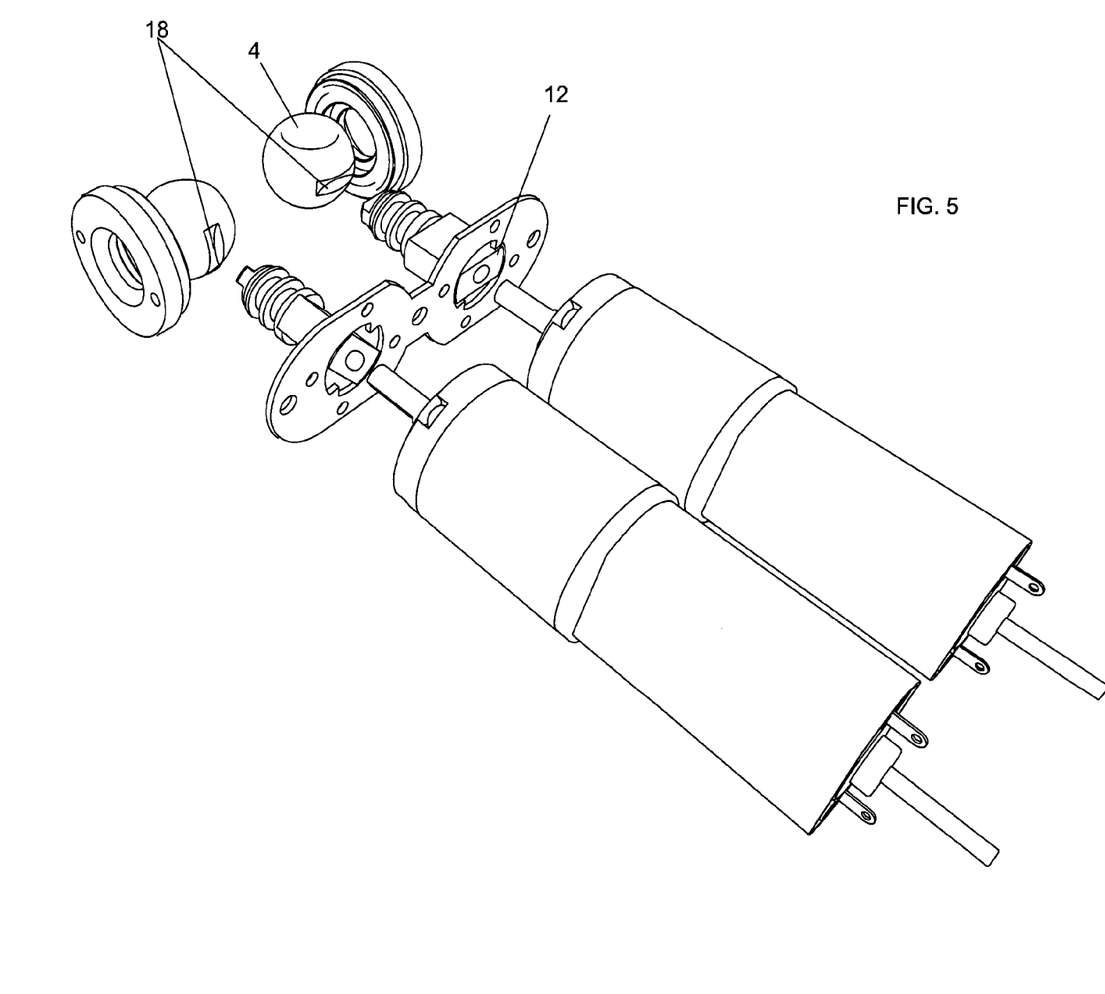
FIG. 5 illustrates yet another exploded view of the motors controlling pins, control spheres and seal washers.

With 30, in drawing 3, the LED indicating correct operation or a fault of the device 20 is indicated, whereas 31, in drawing 3A, indicates the distribution collector of the two flows of hot and cold water, the collector being placed at the inlet of the series of devices 20 joined together as disclosed previously.

Figure 6:
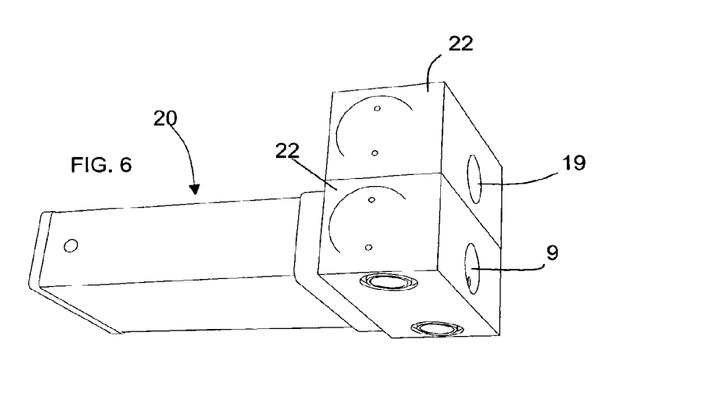
FIGS. 6, 7 and 8 illustrate an embodiment of the device with to outlets of the mixed flow that are nevertheless served by a single electronic and hydraulic control system.
Figure 7:
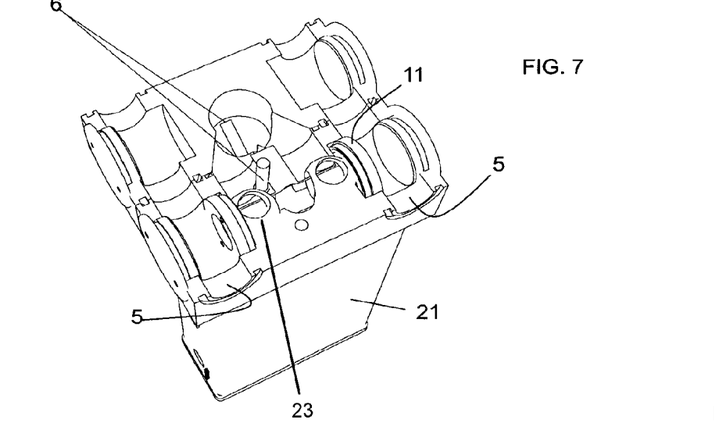
Figure 8:
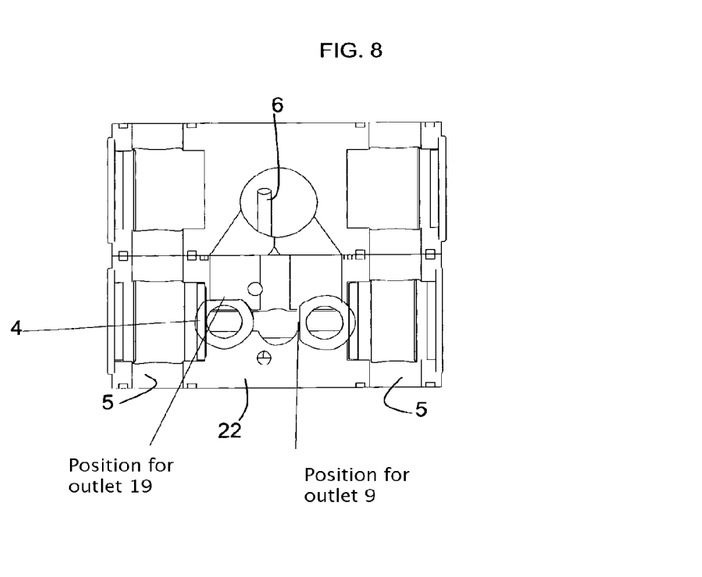

With reference to FIG. 6 there is illustrated an embodiment of the device 20; it comprises two outlets served by a single motor/electronic and hydraulic control.

The two outlets are indicated by 9 and 19.

Now, the balls 4 of the single valve 22 have holes that are such that one is aligned with the motor and thus remains always positioned as in the drawing; substantially, it constantly accepts the water from the collector. The other hole on the sphere can be moved by the rotation of the pin 3 and can in this manner supply the central outlet 9 or the hole upwards that connects with the second outlet 19.

A further third position of the sphere 4 will close totally so as to stop the flow.

The invention claimed is:

1. Liquids mixing device (20) with electronic control of temperature and of outlet flowrate, that comprises a three-way valve first body (22) for intercepting fluids joined to a second body (21) that extends perpendicularly therefrom and contains internally control electronics (1) and the means for driving fluid comprised of: a valve first body (22) comprising two inlet holes (5) and an outlet conduit (9) for water mixed by the device (20); said outlet conduit (9) disposed along an axis AA of the valve whereas along a perpendicular axis BB a connecting conduit (23) connects the outlet conduit (9) and the inlet holes (5), the inlet holes (5) arranged perpendicularly to both outlet conduit (9) and connecting conduit (23), along an axis CC; in the connecting conduit (23) spheres (4) are arranged for intercepting and adjusting fluid flowrates; the spheres (4) being rotatable by respective pins (3) that are inserted into the valve first body (22) via corresponding holes (2) arranged along parallel axes DD that are coplanar to the axis AA of the outlet conduit; said pins (3) controlled by motors (14) that manage the corresponding rotation thereof according to axis DD according to the incoming signals from the control electronics (1); the control electronics (1) act on the motors (14), controlling the position thereof through a mechanical limit switch (12); characterised in that one portion (3B) of the pin (3), from the side of the second body (21) that manages the electronics, has a square section for abutting against a limit switch (12) that is integral with a support (13) inside the second body (21); an end portion (3D) of the pin (3) is suitable for being inserted into a seat (18) obtained on a corresponding sphere (4) so as to make the pin (3) and the sphere (4) integral and manage the adjustment of the flowrate and of the temperature.

2. The liquids mixing device according to claim (1), characterised in that the pins (3) have seal members (3C) for coupling inside a hole (11) of the valve first body so as to ensure the seal thereof.

3. The liquids mixing device according to claim (2), characterised in that said device comprises rapid stacking holes 10 for rapid stacking of the units.

4. The liquids mixing device according to claim (2), characterised in that the device comprises a plurality of contacts (10B), supplying bridges to enable an entire distribution system to be supplied, connecting a single device (20) to an electrical source.

5. The liquids fixing device according to claim (1), characterised in that said seat (18) and said end portion (3D) are quadrangular.

6. The liquids mixing device according to claim (2), characterised in that the device is modular and consists of two or more devices (20) with valve first bodies (22) connected parallel.

7. The liquids mixing device according to claim 1, characterised in that the device comprises, a temperature control probe (6) for controlling temperature on the outlet conduit (9), connected to the control electronics (1), and dedicated software for precise adjustment of the motors (14) that control the pins (3.

8. The liquids mixing device according to claim 1, characterised in that the device further comprises a pressure control device (7) for controlling pressure on the outlet conduit (9), said device (7) comprising:
 a. a piston (7A) with magnet
 b. a magnetic field sensor (7C) and
 c. a spring (7B);
wherein, in the event the piston (7A) is driven by pressure on the outlet conduit, the magnetic field sensor (7C) detects the approaching presence of the piston with magnet, and in the event of an absence of pressure on the outlet conduit, the spring (7B) positions the piston with magnet (7A) in a rest position, at which point the sensor (7C) is unable to detect the presence thereof.

9. The liquids mixing device according to claim 1, characterised in that the device additionally comprises reserve batteries (8) to command the motors in the absence of electric power; said batteries (8) having a charge sufficient to enable the spheres to return at least to a closing position.

10. The liquids mixing device according to claim 1, characterised in that it comprises the first outlet conduit (9), and a second outlet conduit (19), only the first outlet conduit being served by the motors; the spheres (4) of the first outlet conduit have seats (18) that are on the same axis as the motors; the spheres also have sphere holes that constantly accept water from a collector (31), said sphere holes (23) can be moved on the seats (18) by the rotation of the pins (3) and can in this manner supply the second outlet conduit (19) with water when the sphere holes are in communication with the second outlet conduit; a further positioning of the spheres (4) will totally stop the flow of water.

* * * * *